United States Patent [19]

Girgis

[11] 4,390,647  
[45] Jun. 28, 1983

[54] NON-STARCH CONTAINING AQUEOUS SIZING COMPOSITION FOR GLASS FIBERS AND SIZED GLASS FIBERS FOR USE IN REINFORCING ELASTOMERS

[75] Inventor: Mikhail M. Girgis, Pittsburgh, Pa.

[73] Assignee: PPG Industries, Inc., Pittsburgh, Pa.

[21] Appl. No.: 238,724

[22] Filed: Feb. 27, 1981

[51] Int. Cl.³ .................... C08L 91/06; C03C 25/02; C08K 9/06

[52] U.S. Cl. .................... 523/212; 106/272; 106/287.16; 106/287.23; 65/3.41; 65/3.44

[58] Field of Search .................... 106/287.23, 211, 270, 106/272; 65/3.41, 3, 41; 523/212, 214

[56] References Cited

U.S. PATENT DOCUMENTS

| | | | |
|---|---|---|---|
| 2,576,915 | 12/1951 | Barrett | 260/29.6 |
| 2,839,430 | 6/1958 | Rimmer | 117/139.5 |
| 2,839,431 | 6/1958 | Rimmer | 117/139.5 |
| 2,980,556 | 4/1961 | McClelland | 117/138.8 |
| 3,249,411 | 5/1966 | Williams et al. | 65/3.41 |
| 3,462,254 | 8/1969 | Marzocchi et al. | 65/3 |
| 3,776,766 | 12/1973 | Smerz et al. | 117/138.8 F |
| 3,850,869 | 11/1974 | Mohr | 260/29.6 MN |
| 3,924,047 | 12/1975 | Ward et al. | 428/378 |
| 3,997,306 | 12/1976 | Heddex | 65/3.41 |
| 4,009,132 | 2/1977 | Furukawa et al. | 260/29.2 UA |
| 4,067,835 | 1/1978 | Takamori et al. | 260/22 R |
| 4,169,062 | 9/1979 | Weipert | 252/8.9 |
| 4,271,229 | 6/1981 | Temple | 428/288 |

FOREIGN PATENT DOCUMENTS

1503926 3/1978 United Kingdom .

OTHER PUBLICATIONS

Product Literature, Pluracol® V-7 Polyol, from BASF Wyandotte Corporation, Industrial Chemicals Group, Wyandotte, MI.

Product Literature, Pluracol® V-10 Polyol, from BASF Wyandotte Corporation, Industrial Chemicals Group, Wyandotte, MI.

*Primary Examiner*—Theodore Morris  
*Attorney, Agent, or Firm*—Kenneth J. Stachel

[57] ABSTRACT

An aqueous treating composition is provided for glass fibers to produce treated glass fiber strands for use in manufacturing cord of glass fibers for reinforcing elastomeric materials, wherein the glass fibers have a more continuous film of the residue of the aqueous treating composition, and improved wettability.

The aqueous treating composition is a non-starch-containing treating composition having one or more water dispersible, high molecular weight polyoxyalkylene polyols, one or more silane coupling agents and one or more cationic lubricants.

12 Claims, 1 Drawing Figure

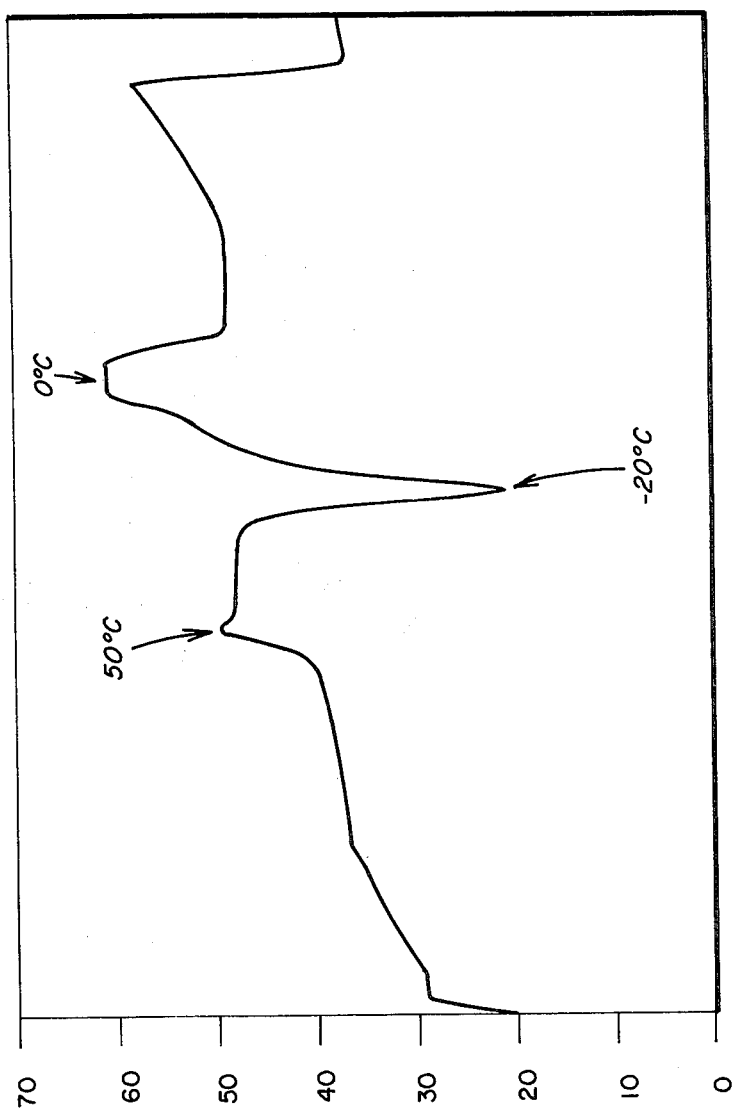

NON-STARCH CONTAINING AQUEOUS SIZING COMPOSITION FOR GLASS FIBERS AND SIZED GLASS FIBERS FOR USE IN REINFORCING ELASTOMERS

The present invention is directed to an aqueous, non-starch containing composition for treating glass fibers and the treated glass fibers that are to be used to reinforce elastomeric material.

More particularly the present invention is directed to an aqueous, non-starch-containing sizing composition for treating glass fibers to produce sized multifilament glass fiber strands that can be coated with an aqueous adhesive composition to produce cord for use in reinforcing tires.

It is well known in the art that in producing glass fibers from molten streams of glass issuing from a bushing in a glass batch melting furnace that the glass fibers must be treated with an aqueous treating composition soon after they are formed from the bushing. The aqueous treating composition comprises film formers, coupling agents, and lubricants and other additional additives depending on the final use of the glass fibers. The sizing composition protects the individual fibers from interfiber abrasion, when the fibers are collected together to form a strand and provides compatability between the glass fiber and matrix materials or coatings that are in contact with the fibers in their ultimate end use.

In the past, aqueous sizing compositions which found particular utility in sizing glass fibers to be coated with an aqueous adhesive coating compositions for use in reinforcing elastomeric materials, had starch type film formers. Examples of such starch film former-containing aqueous treating compositions are shown in U.S. Pat. No. 3,655,353 entitled "Glass Fiber Size" by Nalley and Lovelace and U.S. Pat. No. 3,887,389 entitled "Fiber Glass Sizing for Use in Tire Cord Manufacturing" by Hedden.

It has recently been discovered that glass fiber strands treated with starch-containing aqueous sizing compositions do not permit uniform coating of the treated glass fiber strands with an aqueous adhesive coating composition used in preparing glass fiber strand cord for reinforcing elastomeric materials. It has been found that the starch film-former exists on the fibers as a discontinuous non-uniform film due to the presence of starch agglomerates. These agglomerates sometimes are as thick as the glass fiber itself. The discontinuous film on the surface of the glass fiber engenders variability in the pickup of the adhesive coating applied to the sized glass fibers and strands. In addition, the starch sized glass fibers show poor wettability in aqueous media, when in fact it is an important function of a size on the glass surface to enhance wettability of the glass surface. Enhanced wettability allows for better encapsulation of the glass fibers by the subsequently applied aqueous adhesive coating composition. Also it has been found that the glass fiber cord produced with the use of a starch-containing aqueous sizing composition does not give the best performance results under humidity aging conditions.

It is an object of the present invention to provide an aqueous treating composition for glass fibers to yield treated glass fibers having a more uniform, continuous film in contact with the surface of the fibers.

It is an additional object of the present invention to provide an aqueous treating composition for glass fibers to yield treated glass fibers having improved wettability that consequently allows for better flow and encapsulation in, on and about the fibers in a multifilament strand or strands by an additionally applied aqueous adhesive coating composition.

It is a further additional object of the present invention to provide an aqueous treating composition for glass fibers to yield treated glass fibers to be coated with an aqueous adhesive coating and used as reinforcement in elastomeric materials wherein the reinforced elastomeric materials have improved humidity aging properties.

It is a further additional object of the present invention to provide an aqueous treating composition for glass fibers to yield treated glass fibers to be coated with an aqueous adhesive coating and used as reinforcement in elastomeric materials wherein the reinforced elastomeric materials have improved humidity aging properties.

It is another further additional object of the present invention to provide treated glass fiber strands that have improved wettability and a more uniform, continuous film in contact with the surface of the glass fibers so that when coated with an aqueous adhesive coating to produce cord, the cord has improved properties.

SUMMARY OF THE INVENTION

The foregoing objects and additional objects that are inherent from the following disclosure are achieved by the aqueous treating composition for glass fibers and the treated glass fibers of the present invention.

In its broadest aspect, the present invention is an aqueous treating composition for glass fibers and the treated glass fibers wherein the composition has:

A. about 0.5 to about 5 weight percent of the aqueous composition of one or more water disprsible, polyoxyalkylene polyols including mixtures of polyoxyalkylene polyols,
B. one or more silane coupling agents,
C. one or more cationic lubricants,
D. and water.

An additional material that may be present is one or more nonionic lubricants. The glass fibers are treated with the aqueous treating composition in a conventional manner to produce the treated glass fiber strands of the present invention. The treated glass fiber strands can then be coated with an aqueous adhesive coating to produce glass fiber cord for use in reinforcing elastomeric matrix materials.

BRIEF DESCRIPTION OF THE DRAWING

FIG. 1 is a drawing of a curve produced by differential scanning colorimeter for the aqeuous sizing composition of the present invention.

DETAILED DESCRIPTION OF INVENTION

It is believed, but the present invention is not limited by this belief, that coated glass fiber strands having improved flexibility used as cord to reinforce elastomeric materials will have improved properties of flexibility when the composite as a whole has improved properties of flexibility. The composite is comprised of both sized glass fiber strands and the dried adhesive coating composition on and about the strands. Therefore, when lower values for various properties are obtained for coated glass fiber strand or strands, the lower values could be due to the sized glass fibers or the adhesive coating. It is suspected that some of the lower values for various properties of the glass fiber strand cord are attributable to the characteristics of the aqueous sizing composition used to treat the glass fibers and the resultant sized glass fiber strands ability to be uniformly coated with an adhesive coating composition. The aqueous sizing compositions having a starch binder, which have been used for treating glass fibers that are to be coated with an aqueous adhesive composition to produce cord for reinforcing elastomeric material, lead to reduced performance of the cord in the elastomeric materials due to the discontinuous film of the residue of the aqueous sizing composition on the surface of the glass fibers. The replacement of the starch binder in an aqueous sizing composition with a more flexible polymeric binder or film former would provide a remedy for this problem. Of course, the flexible binder must still allow for the chemical coupling of the residue of the aqueous sizing composition to the inorganic glass fiber and to the organic matrix of an adhesive coating composition that is applied to the size glass fiber strands. The aqueous sizing composition with the flexible film former that makes up a compatible package for the aqueous adhesive coating that is also applied to the glass fiber strands should provide a more continuous film on the surface of the glass fibers and provide improved wettability that will enhance the flow and encapsulation of the fibers and strands by the adhesive coating composition.

A more flexible film former that has been found to perform all these roles is one or more high molecular weight, water dispersible polyoxyalkylene polyols. The polyoxyalkylene polyols are from a class of compounds known as polyether polyols. The water dispersible, high molecular weight polyoxyalkylene polyols can be made any suitable method known to those skilled in the art such as the base catalyzed reaction of alkylene oxide, such as methylene oxide, ethylene oxide, propylene oxide, butylene oxide, and the like with triols such as glycerol, trimethylolpropane and 1,2,6-hexantriol. Polyols having four or more hydroxyl groups have similarly been reacted with the alkylene oxide to prepare the oxyalkylated derivatives. The higher alkylene materials and higher polyol materials such as pentaerythritol and sugar alcohols can be used if any resulting solid material is properly emulsifiable with surfactants in water. This relates to the water dispersible nature of the polyoxyalkylene polyol. So the polyoxyalkylene polyol can be either a solid or liquid as long as it is dispersible or emulsifiable or soluble in water. The amount of one or more of these polyoxyalkylene polyols is in the range of about 0.5 to about 5 weight percent of the aqueous sizing composition. Nonexclusive examples of these polyether polyols include poly(oxypropylene) adducts of trimethylolpropane, poly(oxypropylene) adducts of glycerol; poly(oxypropylene-B-oxyethylene) adducts of trimethylol propane and the like. The average molecular weight range of these polyether polyols is generally about 300 to about 12,000 and preferably about 700 or more to around 10,000. A particularly suitable mixture of these polyether polyols is a blend of a 7000 average molecular weight, liquid polyoxyalkylene polyol with a 10,000 average molecular weight, liquid polyoxyalkylene polyol. In this blend, the polyoxyalkylene polyols are poly(oxypropylene) adducts of trimethylol propane. This blend can have any proportion of the two materials but it is preferred to have a 50/50 blend. This blend can be prepared by combining the commercially available liquid polyalkylene polyol designated Pluracol ® V-7 polyol with the liquid polyoxyalkylene polyol designated Pluracol ® V-10 polyol both available from BASF-Wyandotte Corporation, Industrial Chemicals Group, Wyandotte, Michigan.

The Pluracol ® V-7 polyol has the following properties:

| PLURACOL ® V-7 POLYOL TYPICAL PHYSICAL PROPERTIES | |
|---|---|
| Specific Gravity, 25° C./25° C. | 1.090 |
| Flash Point, °F. | 510 |
| Fire Point, °F. | 580 |
| Pour Point, °F. | +25 |
| Ash, Typical, % | 0.2 |
| Specification (max.), % | 0.3 |
| Viscosity, as-is, at 210° F., SUS | 930 |
| cs | 200 |
| at 100° F., SUS | 5600 |
| cs | 1200 |
| Viscosity of Aqueous Solutions at 100° F. | |
| 20% Solution, SUS | 49 |
| cs | 7.0 |
| 50% Solution, SUS | 380 |
| cs | 81.4 |
| Inverse Cloud Point (2.5% aqueous solution) °F. | 180 |
| Solubility | Pluracol ® V-7 is soluble in water, alcohols, and glycols |

The Pluracol ® V-10 polyol has the following properties:

| PLURACOL ® V-10 POLYOL TYPICAL PHYSICAL PROPERTIES | |
|---|---|
| Appearance | Pale, yellow, clear viscous fluid |
| Viscosity at 210° F. | 6,000 cst (ASTM D445-53T) |
| at 100° F. | 45,000 cst (ASTM D445-53T) |
| Specific Gravity 60/60° F. | 1.089 (BWC test) |
| Flash point | 510° F. (ASTM D92-52) |
| Fire point | 535° F. (ASTM D92-52) |
| Surface tension (1% aq.) | 54.7 dynes/cm. at 75° F. (ASTM D1331-56) |
| | 48.4 dynes/cm. at 105° F. (ASTM D1331-56) |
| | 44.2 dynes/cm. at 110° F. (ASTM D1331-56) |
| Shear Stability (in a typical fire resistant fluid) change in viscosity 12,000 cycles, 1000 psi | +1% (nod. VVL 791 method 3471) |

In addition to the one or more polyether polyol, the aqueous treating composition also has one or more silane coupling agents. Any suitable silane coupling agent can be used, but it has been found to be particularly suitable to have a silane coupling agent in combination with a lubricant to be used in the aqueous treating composition of the present invention. Such a material is commercially available from Union Carbide Corporation under the trade designation Y-9072 Lubricant Modified Gamma Amino Propyl Triethoxysilane. Another suitable silane coupling agent is that commercially available from Union Carbide Corporation under the trade designation A-189 which is a gamma mercaptopropyltrimethoxysilane.

In addition to the polyether polyol and silane coupling agents, the aqueous treating composition of the present invention has one or more cationic lubricants present to protect the glass fibers during processing. Any suitable cationic glass fiber lubricant can be used. A particularly suitable cationic lubricant is the polyamine lubricant available under the trade designation Emery 6760 manufactured by Emery Industries, Inc. Another suitable cationic lubricant is the Cation-X material which is an alkyl amidazoline reaction product of tetraethylene pentamine, a stearic acid.

The amounts of the silane coupling agent and the cationic lubricant used in the aqueous treating composition are those amounts conventionally used in such compositions. Other ingredients know to those skilled in the art may be added to the aqueous treating composition to impart varying characteristics thereto. However, the materials previously recited have found particular utility in an improved aqueous treating composition for use with glass fibers that are to be coated with an adhesive coating composition to yield coated glass fiber strand cord to be incorporated into elastomeric matrices. The method of applying the aqueous treating composition to glass fibers may be any suitable method known to those skilled in the art for applying an aqueous composition during the formation of glass fibers.

The aqueous treating composition is prepared by adding to a majority of the water needed to make the composition the other components to be in the composition. This includes the polyether polyol or mixture, the cationic lubricant and the silane coupling agent. Then the mixture is diluted to the final desired volume.

The treated glass fibers and/or strands are then dried by air drying or drying at an elevated temperature in a forced air oven or other suitable device. The glass fibers, which term include bundles of glass fibers and strand or strands of glass fibers are coated with any suitable aqueous adhesive coating composition used to prepare tire cord by any suitable method known to those skilled in the art with any suitable aqueous adhesive coating composition. It has been found particularly suitable to use an aqueous adhesive coating composition having a vinyl pyridine-containing copolymer and/or terpolymer latex wherein the other monomers used to form the polymers are a 1,3-diene hydrocarbon monomer or the 1,3-diene hydrocarbon monomer and a vinyl-containing monomer such as styrene. The aqueous adhesive coating composition also has a resorcinol formaldehyde resin which is comprised of predominantly trimer polymers such as that disclosed in allowed U.S. patent application Ser. No. 965,473 filed Oct. 30, 1978 now U.S. Pat. No. 4,314,050 by Mikhail M. Girgis assigned to the same assignee as the present application and which is hereby incorporated by reference. The adhesive coating composition also has a non-self-crosslinkable elastomeric latex present in an amount of about 45 to about 95 weight percent of the dried aqueous coating composition, and preferably in a predominate amount over the vinyl-pyridine-containing latex and having a low gel content and a low average particle size. Preferably the aqueous adhesive coating composition also has a wax emulsion, a carboxylated styrene butadiene copolymer and an antioxidant.

This aqueous coating composition has a vinyl-pyridene-containing latex which can be any suitable vinyl-pyridine-containing latex. Nonexclusive examples include vinyl-pyridine copolymers with a diene hydrocarbon monomer and vinyl-pyridene terpolymers with diene hydrocarbon monomer and a vinyl-containning monomer like styrene. As the vinylpyridene that which is commonly used is 2-vinyl-pyridine but others such as 3-vinyl-pyridine, 4-vinyl-pyridine, 2-methyl-5-vinyl-pyridine, 2-methyl-6-vinyl-pyridine, and 2-ethyl-4-vinyl-pyridine. The diene hydrocarbon monomers can be butadiene-1,3, isoprene, 2,3-dimethyl-1, 3-butadiene, 2-ethyl-1, 3-butadiene and the like. The vinyl-containing material can be any styrene-like monomer. These copolymers and terpolymers can be formed by any suitable method known to those skilled in the art for producing elastomeric latices. The ratio of diene to vinyl-pyridine in a copolymer ranges from 95/5 to about 20/80. For the terpolymer a typical ratio of diene to (styrene) vinyl-pyridine is 70/15/15.

The phenolic-aldehyde polymer condensate can be any reaction product of a phenolic compound including phenol, polyhydric phenols such as resorcinol, hydroquinone, catechol, and substituted phenols with straight and/or branched chain alkyl radicals having 1 to 16 carbon atoms such as cresol, isopropyl phenol, xylenols and the like and mixtures of these materials. Generally a polyhydric is used at least in part in preparing the phenolic aldehyde condensate polymer. The aldehyde can be a suitable aldehyde for producing such a condensate and includes lower aliphatic aldehydes having 1 to 3 carbon atoms e.g., formaldehyde in its various forms including formalin and polymeric forms such as paraformaldehyde and mixtures thereof, acetaldehyde and propionaldehyde, and crotenaldehyde.

The phenolic compound and aldehyde are reacted in any suitable manner known to those skilled in the art for producing phenolic aldehyde polymers for use in an aqueous adhesive coating composition. A commercial resorcinol formaldehyde resin that can be used by itself or with additional reaction is the material "Penacolite" R-2170 resin available from Koppers Company, Inc. Also a resorcinol formaldehyde condensate polymer can be prepared from resorcinol and formaldehyde or formaldehyde donating material in a process taught in my copending U.S. patent application Ser. No. 956,473 filed Oct. 30, 1978, now U.S. Pat. No. 4,314,050 entitled "Modified Phenolic Aldehyde Resin to Produce an Improved Adhesive Coating and Method of Making Same" (M. M. Girgis). This application is assigned to the assignee of the present application and is hereby incorporated by reference and made a part hereof.

The term "non-self crosslinkable" as used herein refers to a polymeric material that cannot undergo intramolecular or internal crosslinking with itself, but can undergo intermolecular or external crosslinking with other materials. The intramolecular crosslinking means one part of the same molecule or polymeric chain crosslinks with another part of the same molecule or chain. The term "chain" includes the polymeric backbone chain and pendant groups.

The non-self crosslinkable elastomeric latex is an elastomeric reaction product formed by the reaction of 1,3-diene hydrocarbon monomers such as butadiene-1,3; isoprene, 2,3-dimethyl-1, 3-butadiene, 2-ethyl-1, 3-butadiene and the like alone as homopolymers or in mixtures as interpolymers and ethylene-propylene-diene rubber (EPDM) produced in a suitable manner from such dienes as dicyclopentadiene, 5-ethylidene-2-norbornene; 1,4-hexadiene; 5-methylene-2-norborene; interpolymerized with ethylene and an alpha-mono-olefin having from 3 to 20 carbon atoms such as propylene; nitrile rubber such as nitrile butadiene latex; and butyl rubber, which is a commercial name for copolymers of isobutylene with small amounts of butadiene or isoprene, and mixtures thereof. The non-self crosslinkable elastomeric latex has a gel content of less than 40 weight percent and preferably around less than 25 weight percent.

The gel content is measured in a two part test, wherein the first part consists of coagulation of the polymer in the latex and, wherein the second part consists of finding the gel content of the polymer. The steps for the coagulation of the latex and the drying of the polymer involve taking around 100 milliliters of the latex and mixing it with 100 milliliters of a 33% Polygard emulsion, a stabilizing liquid mixture of alkylated arylphosphites then adding 50 milliliters of 2-propanol to the Polygard emulsion, latex mixture. The mixture is added very slowly to 420 milliliters of an emulsifier mixture consisting of N-alkyl trimethyl ammonium chloride in a 0.3% solution. The latex should not be sufficiently kicked out, if not more 2-propanol is added. The polymer is filtered and washed and placed in an aluminum pan, and the pan is placed in a vacuum oven for at least 16 to 24 hours at ambient temperature. After the polymer has dried to less than 1% moisture, three-tenths (0.3) grams of the polymer are weight out and placed into 100 milliliters of toluene and left standing out of direction light for 24 hours. The toluene polymer mixture is then filtered and the filtrate is placed in an aluminum pan to evaporate the toluene. The polymeric residue is weighed and the percent polymer in the filtrate is determined. The percent gel is then calculated according to the following formula:

Weight % Gel =

$$\frac{\text{Original Weight of Polymer} - 4 \text{ (Weight of Filtrate)}}{\text{Original Weight of Polymer} \times 100}$$

In addition to the gel content being less than 40 weight percent the particle size of the non-self crosslinkable elastomeric latex must be less than 2000 Angstroms and preferably from about 500 to about 1400 Anstroms. The average particle size and particle size distribution can be determined by hydrodynamic chromatography. See, for example, small, journal Coll. Inter. Sci., 48, 147, (1974); McHugh et al, J. Coll. Inter. Sci., Vol. IV, pages 549–561, (1976) and Hamielec, COLUMN CHROMATOGRAPHY OF PARTICLES SUSPENSIONS AXIAL DISPERSION CORRECTIONS, Paper Presented at the Cleveland-Akron GPC/LC Symposium, Cleveland, Ohio (April, 1977).

The low gel content, low average particle size non-self crosslinkable elastomeric latex can be produced by any suitable method that is well known in the art of polymerization techniques. Examples of suitable techniques involve the pre-emulsification technique and the seeding technique in an emulsion polymerization process. The desired gel content can be achieved by any suitable method such as by limiting the polymerization reaction by the use of suitable chain terminating agents. A suitable non-self crosslinkable elastomeric latex is one available from Goodyear Tire and Rubber Company under the trade designation "LPM-6290" which is a 1,3-polybutadiene homopolymer latex. This material has a total solids of 43–46%, a pH of 8.0 to 9.5, a viscosity of 600 max centipoise (RFT No. 1 at 20 rpm), coagulum 0.05% max, mechanical stability 55–75 milligrams, surface tension around 58–74 dynes per centimeter (cm), particle size in the range of 500–2000 Angstrom (A) and a gel content of 25% max.

The amounts of the various components in the aqueous adhesive coating composition can be varied to some degree and can be varied in relationship to each other. The amount of the non-self crosslinkable elastomeric latex is present in an amount of at least 45 weight percent of the dried solids of the composition and preferably in a predominate amount over the vinyl-pyridine-containing elastomeric latex, when the percent solids of the latices are comparable. The amount of the vinyl-pyridine-containing elastomeric latex can vary within a range from about 5 to about 55 weight percent on a dried basis of the aqueous coating composition and preferably about 10 to about 30 weight percent. The amount of the non-self crosslinkable elastomeric latex varies in the range from about 45 to about 5 weight percent on a dried basis of the aqueous coating composition and most preferably about 60 to about 85 weight percent. The phenolic aldehyde resin component can be any suitable resorcinol aldehyde resin but is preferably a resorcinol formaldehyde resin. The amount of this material can be any suitable amount used in aqueous adhesive coating compositions for treating filamentary materials such amounts can be in the range from about 4 to about 8 weight percent on a dried basis of the aqueous treating composition. A suitable vinyl-pyridine-containing elastomeric latex is a vinyl-pyridine butadiene-styrene terpolymer such as that commercially available from Goodyear Tire and Rubber Company under the trade designation "LVP-5622B" having a total solids of 40–42%, a pH of 111, a viscosity of 150 centipoise max (RVF number 1 spindel at 20 rpm), coagulum 0.1% max, mooney ML-4 at 212° F., 65–85 and mechanical stability of 1,000 milligrams max and surface tension of around 1100 angstrom max. Another suitable vinyl-pyridine-containing elastomer is a butadiene-vinyl-pyridine styrene terpolymer latex available from Firestone Tire and Rubber Company under the trade designation "SR6642" (having a 41% by weight solid).

In addition to the three main components of the aqueous treating composition, additional components can be used to further improve the final properties of the treated filamentry material.

Such materials include wax emulsions, which can be a microcrystalline wax or paraffinic wax or mixture thereof or any other suitable wax emulsion used in conventional amounts. Suitable wax emulsions are available from Mobil Oil Company under the trade designation "Mobilcer Waxes". Preferably up to 15 parts by weight on a dry solids basis of the aqueous coating composition incorporated into the coating composition. Greater than 15 weight percent of wax may detrimentally affect adhesion of the coating composition to the resin matrix. The preferred amount of the wax is up to about 5 weight percent to obtain the maximum benefit. These waxes generally have a melting point of higher than about 50° C. The preferred melting point for the microcrystalline waxes is above about 100° C. or more preferably about 135° C. When paraffin wax is employed in the coating composition its melting point should generally vary between 50° C. and about 80° C.

Another additional component that may be added to the aqueous treating composition is one or more antioxidants, such as any suitable hindered phenolic type antioxidant or amine type antioxidant. The amount of the antioxidant which is added is generally in the range of around less than 5 parts per 100 parts of the dry rubber to enhance the coating flexibility over a wide range of temperatures. A suitable antioxidant is that available from Akron Dispersion of Akron, Ohio under the trade designation "BOSTEX 294".

Another component that may be included in the aqueous treating composition is a treated diatomaceous earth which provides heat tensile aging characteristics. The chemically treated diatomaceous earths are those hydrothermally reacted with lime or magnesium oxide. Specifically these materials are characterized by hydrocalcium silicates and hydromagnesium silicates. Materials such as Microcell ® and Celikate ® materials available from Johns-Mansville Company are useful diatomaceous earths so long as they contain a calcium oxide level in the range of about 22% to about 28% and a magnesium oxide level of about 16%. Another suitable calcium treated diatomaceous earth in combination with an antioxidant is Paracure ® A09 material.

When the amount of non-self crosslinkable elastomeric latex is around 65 weight percent or more on a dried basis of the aqueous sizing composition, an amount of carboxylated styrene butadiene copolymer or carboxylated butadiene polymer should also be present. The addition of the carboxylated polymer to the aqueous coating composition gives the coating increased adhesion properties. The amount of carboxylated styrene butadiene added is in the range of about 0.5 to about 3 weight percent of the dried solids of the aqueous coating composition. Generally the amount of the carboxylated material should increase within this range as the amount of non-self crosslinkable elastomeric latex is increased above 65 weight percent on a dried solids basis. An amount over 3 weight percent at higher amounts of the non-self crosslinkable elastomeric latex may detract from the flexibility of the ultimate coating. Suitable carboxylated styrene butadiene copolymers for use in the coating composition are the Dylex of Polysor styrene butadiene materials available from Arco Polymer, Inc. Also, a carboxylated butadiene polymer like Firestone SR6610 latex can be used.

Other ingredients known to those skilled in the art may be added to the coating composition to impart varying characteristic thereto. However, the materials as previously recited have been found of particular utility in an improved aqueous coating composition for use in producing coated filamentary cord to be incorporated into elastomeric matrices. With the use of the latices in the present aqueous coating composition, there will also be present the materials used in producing the various latices by emulsion polymerization. These materials include various surfactants, initiators, and chain terminators and/or chain transfer agents and other emulsion polymerization process aids. For example, the chain transfer agent sodium dimethyl dithiocarbamate or other mercaptons may be present, which was used to terminate a growing chain radical and start a new one to result in shorter polymeric chains. This is one method of controlling the gel content for the non-self crosslinkable elastomer. In addition, other sulfur polymerization modifiers may be present.

DESCRIPTION OF THE PREFERRED EMBODIMENT

In the preferred embodiment of the aqueous treating composition of the present invention the one or more high molecular weight liquid polyoxyalkylene polyols is the 50/50 blend of the polyoxyalkylene polyols commercially available under the trade designation Pluracol ® V-7 and Pluracol ® V-10 materials. The amount of the blend is in the range of about 0.5 to about 5 weight percent of the aqueous treating composition and preferably about 1 to about 3 weight percent. The silane coupling agent is preferably a lubricant modified amino silane coupling agent available under the trade designation Y-9072 silane present in an amount in a range of about 0.01 to about 2 weight percent of the aqueous treating composition. The preferred cationic lubricant is the polyamine lubricant commercially available lubricant which is an acidified cationic fatty acid amide, under the trade designation Emery 6760 present in an amount of about 0.01 to about 4 weight percent of the aqueous treating composition. The total solids of the aqueous treating composition can be any conventional solids range for sizing compositions to place the desired LOI on the glass fibers. Preferably, the total solids is from around 3 to around 20 weight percent. Also it is preferable to apply the aqueous treating composition to the glass fibers in such a manner to give an LOI for the glass fibers in the range of around 0.1 to about 1 percent and most preferably about 0.2 to about 0.8 percent.

FIG. 1 exhibits a differential scanning colorimeter curve of the preferred aqueous treating composition of the present invention. The differential scanning colorimetry (DSC) gives information about the transitions of the film of the dried aqueous treating composition. The DSC measures the differential power input necessary to maintain the sample and reference at the same temperature as they are heated. This method monitors the thermodynamic property known as enthalpy. The DSC curve of FIG. 1 was prepared with a Perk & Elmer device having a range in mcal per second of 10, a temperature balance of 483, a zero base at 366 and a slope of 458. The slope on set was 105, the heat rate was 40° K. per minute and the lower limit was 135° K. with the upper limit of 350° K. The chart range was 10 m.v. and the chart speed was 40 millimeters per minute. The sample weight of the material of the material was 6 milligrams. The DSC curve shows transitions at 50° C., $-20°$ C. and 0° C.

Additional information concerning the preferred embodiment is presented in the following examples.

EXAMPLE 1

An aqueous treating composition was prepared by placing 24,700 grams of deionized water into a vessel and adding 300 grams of the polyalkylene polyol (Pluracol ® V-7) to the water with agitation. The polyoxyalkylene polyol (Pluracol ® V-10) polyol was added in an amount of 300 grams. 200 grams of the cationic lubricant (Emery 6760) was then added with agitation. Following this addition the lubricant modified amino silane Y-9072 silane was added in amount of 200 grams. The aqueous composition was agitated and produced a composition having 3.5 percent solids.

This aqueous treating composition was used to treat K glass fibers to form K-15 glass fiber strand. Such a strand typically has 1,000 filaments, where each filament has a diameter of about 13.34±0.63 microns. One to three strands of the K-15 were coated and manufactured into glass fiber strand cord for reinforcing elastomeric materials.

EXAMPLE 2

Another aqueous treating composition was prepared in the same manner as that of Example 1 having the following formulation.

| | |
|---|---|
| Deionized water | 24700 grams |
| Polyoxyalkylene polyol | 300 grams |
| Polyalkylene polyol | 300 grams |
| Cationic lubricant | 200 grams |
| Gamma mercaptopropyl trimethoxy-silane (A-189) | 200 grams |

The aqueous treating composition prepared had 3.5% solids. This aqueous treating composition was used to treat the same glass fibers to produce treated glass fibers having an LOI of the dried residue of the aqueous treating composition burned from the treated glass fiber strand of 0.4. The range of the LOI is from about 0.2 to about 0.8.

ILLUSTRATIVE EXAMPLE

An aqueous treating composition was prepared having a starch component, an amino silane coupling agent and a cationic lubricant which was the alkyl imidazoline reaction product of tetraethylenepentamine and stearic acid available under the trade designation Cation-X material. The amounts used were conventional amounts and the method of preparation was a conventional method both fully described in U.S. Pat. No. 3,655,353 entitled glass fiber size by Charles E. Nalley and Joe B. Lovelace, incorporated herein by reference and made a part hereof and U.S. Pat. No. 3,887,389 by Jerry C. Hedden entitled "Fiber Glass Sizing for Use in Tire Cord Manufacturing" also incorporated herein by reference.

This aqueous sizing composition was used to treat the K fibers as they were formed into K-15 strands. Three coated strands were used in preparing a tire cord by coating the strand with an aqueous adhesive coating composition, drying, partially curing and twisting together.

The strands of Example 1 and of the Illustrative Example were coated with two types of adhesive coating compositions. The first type had the following formulation:

| Coating A | | |
|---|---|---|
| Ingredients | | 800-Gallon Mix |
| Premix Vessel | | |
| I. | Deionized Water (110° F.) | 36.8 gal |
| | Resorcinol | 102.2 lb |
| | Formaldehyde | 82.0 lb |
| II. | Deionized Water | 30.7 lb |
| | Potassium Hydroxide | 2.3 lb |
| Main Vessel | | |
| I. | Polybutadiene Homopolymer latex | 2400 lb |
| | Vinyl pyridine terpolymer latex | 1153 lb |
| | Ratio of Polybutadiene/Vinyl pyridine terpolymer | 70/30 |
| | Bostex 294 hindered phenol (antioxidant) | 30.7 lb |
| | Mobilcer Q wax emulsion | 215.4 lb |
| | Deionized Water | 260 gal |
| II. | Resorcinol formaldehyde resin | |
| III. | Deionized Water | 4.6 gal |
| | Ammonium Hydroxide | 9.3 lb |
| IV. | Deionized Water | 4.6 gal |
| | Carboxylated styrene butadiene copolymer latex | 61.6 lb |

To a premix vessel there is added water at 110° F. (43° C.) and the resorcinol is added to the water and agitated until completed dissolved. At this point the formaldehyde is added to the premix. The premix temperature should be around 80° F., and if it is not it must be adjusted to around 78°–80° F. and the premix aged for 4 hours. The pH during the aging should be around 3.8–5.5. Deionized water and potassium hydroxide are mixed together until dissolved. At the end of the four hour aging period the deionized water and potassium hydroxide are added slowly to the premix. The premix temperature is maintained at a temperature of around 75° to 80° F. for around five hours and a pH of 7.5 or higher.

To a main mix tank there is added the polybutadiene homopolymer with the desired gel content and particle size, the polyvinyl-pyridine-butadiene-styrene terpolymer latex and water along with the antioxidant and the wax emulsion. Then the resorcinol formaldehyde resin from the premix vessel is added to the main mix tank and agitated for 25 minutes and this mixture is allowed to age for around ten hours. Water and ammonium hydroxide are combined and added to the main mix tank after the aging period. This mixture is stirred for around ten minutes and then the carboxylated styrene-butadiene copolymer latex is combined with water and added to the main mix tank with agitation. A suitable carboxylated styrene butadiene latex is that commercially available from Arco polymers under the trade designation "Dylex 55-EE" or any of the carboxylated styrene butadiene polymers manufactured under the Dylex and Polysar trademarks.

The cord was constructed of K-15 3/0 product and utilized as reinforcement in elastomeric materials which was conventional rubber stock for tires. Also the cord can be constructed of G-75-5/0 strands, when the cord is to be used in biased belted tires and G-75-10/0, or G-75/15/0 when the cord is to be utilized in the carcass and the belts of radial tires. The G-fibers characteristically have a diameter of 9.53±0.63 microns and have a filament count of 2,000 in a cord being constructed of five strands, each strand having 400 filaments. When G-cord is used in biased belted tires the cord should be constructed of five strands, and when the cord is to be used in radial tires, there should be 10 to 15 strands per cord. The 10 to 15 strands allow higher packing of the cord per unit area thereby providing greater strength to the tire carcass. The strength is necessary to obtain desirable properties in radial ply tires. It is preferred that three separately impregnated bundles of filaments be twisted together to form the finished 3/0 tire cord. The three bundles of K-15 1/0 fibers are coated by the method described in the preferred embodiment with the aqueous adhesive treating composition specified above, dried, and partially cured and then twisted together to form the finished 3/0 tire cord. This tire cord was then used to reinforce rubber and the reinforced rubber tested for its properties.

The second aqueous coating composition was prepared having the following composition:

| Coating B % Solids: 27 ± 0.5 pH 8.5 ± 0.3 | |
|---|---|
| Ingredients | 205 Gal. Mix |
| Deionized Water (110° F.) | 12 gal |
| Resorcinol | 20.8 lbs |
| Formaldehyde | 22.8 lbs |
| Deionized Water | 2 gal |
| Potassium Hydroxide | 0.6 lb |
| Polybutadiene Homopolymer latex (Firestone 6803) | 532 lbs |
| Vinyl pyridine terpolymer latex (Firestone 6642) | 400 lbs |

-continued

| Coating B | |
|---|---|
| % Solids: 27 ± 0.5 | |
| pH 8.5 ± 0.3 | |
| Ingredients | 205 Gal. Mix |
| Ratio of polybutadiene/vinyl pyridine terpolymer | 60/40 |
| Bostex 294 hindered phenol antioxidant | 8 lbs |
| Deionized Water | 48 gal |
| Deionized Water | 10 gal |
| Mobilcer Q | 40 lbs |
| Paracure ® A-09 | 4 lbs |
| Deionized Water | 4 gal |
| Ammonium Hydroxide | 2.4 lbs |
| Deionized Water | 4 gal |
| Resorcinol | 4 lbs |

In preparing the aforelisted formulation the resorcinol formaldehyde resin was prepared substantially the same way as in Example 1 and the latices and antioxidant were mixed in the same manner. There wasn't any carboxylated styrene butadiene copolymer used, but a mixture of calcium treated diatomaceous earth 50% and 2,6-ditertiary butyl phenol 50% known as PARACURE ® 809 antioxidant material was combined with the wax emulsion and water and this mixture was added to the mixture of latices. Then the resorcinol formaldehyde resin was added and then the water and ammonium hydroxide that had been mixed together were added and the material was agitated.

This aqueous treating composition was used in the same method to coat K-15 glass fiber strands that were constructed into tire cord in the same manner as that of Example 1.

The tire cord of Example 1 and the tire cord of the Illustrative Example were used to reinforce the same rubber stock material to produce tires in the same manner. These tires were then tested for their physical properties. The test results are shown in Table I.

The glass fiber strand cord and tires prepared with the aqueous treating composition of Example 1 and the Illustrative Example were subjected to several tests for comparison purposes. Table I presents the results of these tests showing the various physical properties for the different cord.

TABLE I

| | | Coating Pick Up | In-Rubber Tensile | | |
|---|---|---|---|---|---|
| | | | Original | 28 Days | % Loss |
| Illustrative Example | K-15, with Coating B | 20.1 | 213 | 178 | 16 |
| Example 1 | K-15, with Coating B | 20.0 | 214 | 186 | 13 |
| Example 1 | K-15, with Coating A | 21.2 | 195 | 143 | 27 |
| Illustrative Example | K-15 Coating A | 20.3 | 187 | 116 | 38 |

| | Strip Adhesion McCreary Stock | Sincofat 18,000 Cycles Room Temp. |
|---|---|---|
| Illustrative Example | 50/4.9 | 0 |
| Example 1 | 64/4.8 | 0 |
| Example 1 | 53/4.9 | 167 |
| Illustrative Example | 36/4.1 | 138 |

From the table it is clear that the cord has improved properties which are attributable to a more continuous film of the dried residue of the aqueous treating composition on the glass fiber surface, improved wettability of the glass fibers and better humidity aging properties.

The foregoing has described a non-starch aqueous treating composition for glass fibers that are utilized in preparing glass fiber cord for reinforcing elastomeric materials. The aqueous treating composition uses one or more flexible film former, which are water dispersible, high molecular weight polyoxyalkylene polyol. The one or more polyoxyalkylene polyol is used in an amount of about 0.5 to about 5 weight percent of the aqueous treating composition. The aqueous treating composition also has one or more silane coupling agents and one or more cationic lubricants. The sized glass fiber strand can be used in producing cord for reinforcement of elastomeric material by coating strands with an aqueous adhesive coating composition.

I claim:

1. An aqueous non-starch-containing composition for treating glass fibers to produce treated glass fibers to be further treated with an aqueous adhesive coating composition to reinforce elastomeric materials, consisting essentially of:
   A. about 0.5 to about 5 weight percent of one or more water dispersible, high molecular weight polyols selected from the group consisting of polyoxy alkylene polyols and polyalkylene polyols having an average molecular weight from about 300 to about 12,000 and mixtures thereof present as flexible film formers,
   B. about 0.1 to about 2 weight percent of one or more silane coupling agents,
   C. about 0.1 to about 4 weight percent of a cationic lubricant,
   D. water in the amount to give a total solids content for the aqueous composition in the range of about 3 to about 20 weight percent.

2. Aqueous treating composition of claim 1 wherein the polyol is a 50/50 blend of a liquid polyalkylene polyol with an average molecular weight of around 7,000 and liquid polyoxyalkylene polyol with an average molecular weight of around 10,000.

3. Aqueous treating composition according to claim 1 or claim 2 wherein the polyoxyalkylene polyols are polyoxyalkylene adducts of trimethylol propane.

4. Aqueous treating composition according to claim 1 wherein the silane coupling agent is a lubricant modified gamma amino propyl triethoxy silane.

5. Aqueous treating composition according to claim 1 wherein the silane coupling agent is a gammamercaptopropyl trimethoxy silane.

6. Aqueous treating composition according to claim 1 which includes a nonionic lubricant.

7. Glass fibers treated with the aqueous treating composition of claim 1 or 2.

8. Glass fibers having the dried residue of the aqueous treating composition of claim 1 or 2 in an amount in range of about 0.1 to about 1 percent LOI.

9. Glass fibers of claim 8 treated with an aqueous adhesive coating composition.

10. Reinforced elastomeric material having the treated glass fibers of claim 9.

11. Aqueous treating composition of claim 1 exhibiting the differential scanning colorimeter curve of FIG. 1 for treating glass fibers.

12. An aqueous non-starch-containing composition for treating glass fibers to produce treated glass fibers to be further treated with an aqueous adhesive coating composition to reinforce elastomeric materials, consisting essentially of:
   A. about 0.5 to about 5 weight percent of one or more water dispersible, high molecular weight polyols selected from the group consisting of polyoxyalkylene polyols and polyalkylene polyols having an average molecular weight from about 300 to about 12,000 and mixtures thereof present as flexible film forming materials to provide a more continuous and uniform film and better wettability than that provided by starch on the surface of the glass fibers, B. about 0.1 to about 2 weight percent of one or more silane coupling agents,
C. about 0.1 to about 4 weight percent of a cationic lubricant,
D. water in the amount to give a total solids content for the aqueous composition in the range of about 3 to about 20 weight percent.

* * * * *